United States Patent Office 3,554,881
Patented Jan. 12, 1971

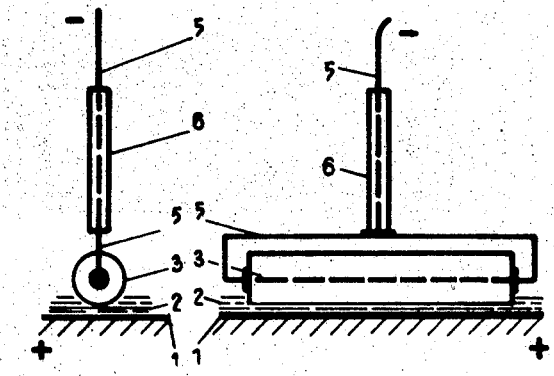
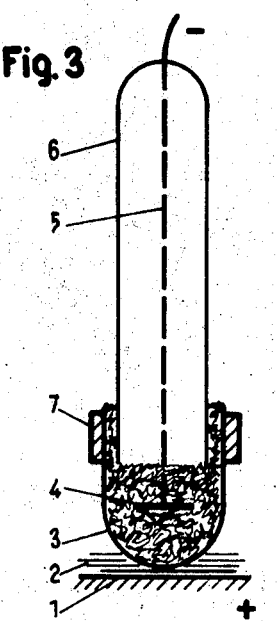
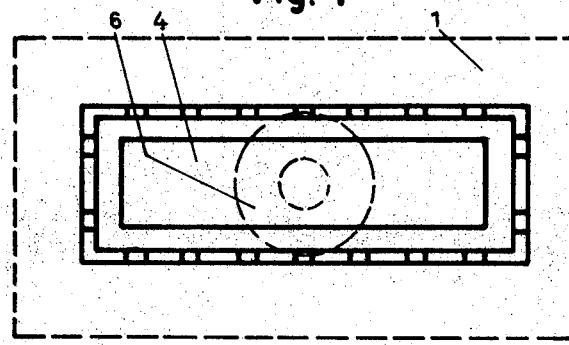
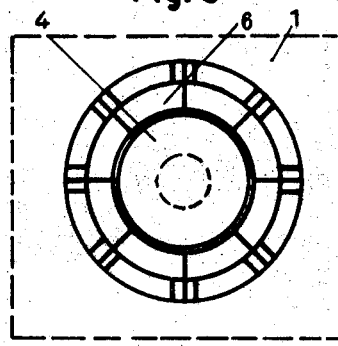
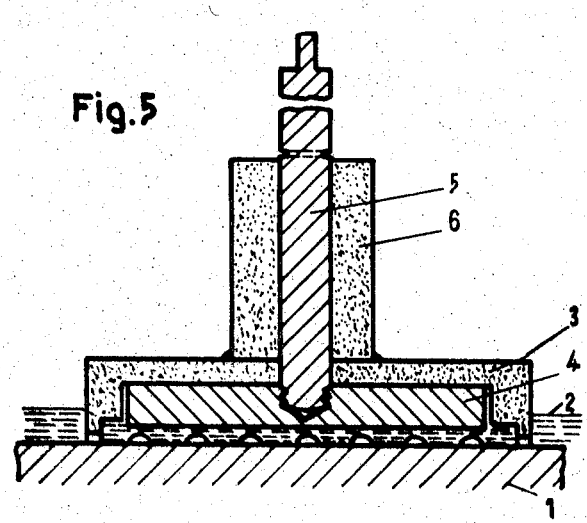
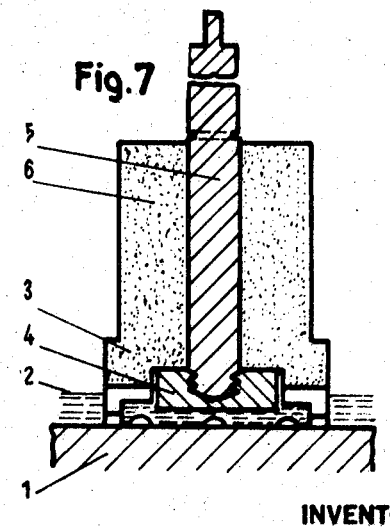

3,554,881
ELECTROCHEMICAL PROCESS FOR THE SURFACE TREATMENT OF TITANIUM, ALLOYS THEREOF AND OTHER ANALOGOUS METALS
Roberto Piontelli, Viale Bianca Maria 26, Milan, Italy
Filed Apr. 19, 1967, Ser. No. 632,885
Claims priority, application Italy, Apr. 23, 1966,
9,365/66; Feb. 9, 1967, 12,456/67
Int. Cl. C23b 5/50, 11/02
U.S. Cl. 204—42
8 Claims

ABSTRACT OF THE DISCLOSURE

An electrochemical process suitable for modifying the surface characteristics of titanium and alloys thereof, as well as of metals having a behavior analogous to that of titanium such as niobium, tantalum and the like. The process may be used to confer to the metals a uniform, pleasant color, required for many applications or, also and mainly, to render it possible to form on them, with known methods, coating layers of any desired metal, which layers are endowed with outstanding characteristics of adhesion, uniformity and compactness. The process according to the invention is characterized in that it comprises an electrochemical treatment of the titanium and the above cited alloys and metals, in baths constituted by concentrated aqueous solutions of a strong base, followed optionally by a second electrochemical treatment with alternating current in baths containing acidic solutions, both treatments being carried out under specific critical conditions of concentration, applied voltage, temperature and time.

---

The present invention relates to an electrochemical process suitable to modify the surface characteristics of titanium and alloys thereof as well as of metals having a behavior analogous to that of titanium such as niobium, tantalum and the like.

The process may be used to confer to the metals a uniform, pleasant color, required for many applications or, also and mainly, to render it possible to form on them, with known methods coating layers of any wanted metal, which layers are endowed with outstanding characteristics of adhesion, uniformity and compactness.

The process according to the present invention is characterized in that it comprises an electrochemical treatment of the metals in baths constituted by concentrated aqueous solutions of strong basic substances, under specific, critical conditions hereinafter disclosed, which treatment is optionally followed by a second electrochemical treatment in baths containing acidic solutions.

It is known that the above indicated metals are very interesting in the metallurgic field owing to their characteristics.

In particular, titanium shows peculiar properties such as high melting point, a density which is about one-half that of iron, a high mechanical strength which is still higher in quite a number of its alloys, a high resistance to chemical etching by many substances, which properties make it very interesting as a structural metal.

However, the full exploitation of such excellent characteristics is limited or prevented by its low resistance to oxidation at high temperatures, which could be overcome by coating the metal or alloys thereof with different metals such as: platinum, rhodium, iridium, chromium, nickel, copper and others. For instance, the following results may be achieved by coating titanium with metals as hereinafter indicated, provided that the coating layer be really adherent to the structure of titanium:

with rhodium it becomes possible to use it also at high temperatures;

with platinum, rhodium and iridium, the resistance to chemical etching is remarkably improved, for example the resistance to chlorine in the electrochemical production of this latter element, or the resistance to electrochemical etching in the cathodic protection with insoluble anodes of metal structures;

with hard chromium, wearing resistance is imparted to it.

Coating layers of tin and cadmium are essential for soft soldering while a silver coating may be useful for brazing.

Similar remarks can be made in respect to niobium, tantalum and related refractory metals.

For the sake of simplicity we will refer in what follows only to titanium.

It is known that the coating layers applied on titanium structures with the usual methods of direct electro-deposition, and when preceded by sandblasting or chemical etching of the surface to be coated, are characterized by a very low adhesion.

There are also known some methods according to which the titanium surface is coated with many metal layers, or with layer of titanium fluoride; however, the practical accomplishment of these methods is complex and in any case the obtained layer is lacking in homogeneity.

I have now found a new process, which is the object of the present invention, which does not present any of the inconveniences of the previously known processes and provides a quite satisfactory solution of the problem set forth above. The process of the present invention essentially consists in a surface treatment of titanium, titanium alloys, niobium, tantalum and like metals, which may be only used to impart to the treated metals a uniform, pleasant color and a velvety appearance or may be used as a pre-treatment preceding the coating with different metals through known processes such as electroplating, metallization, plating and other similar ones.

The process of the present invention may comprise (depending on the metals used to form the coating and also, depending on the desired adhesion characteristics) one or two different surface treatments, which are hereinafter described in detail.

The process of the present invention is carried out by using aqueous solutions of a strong alkali, particularly NaOH and KOH of high concentrations, for example from 350 g./l. up to saturation at room temperature. The materials to be treated, previously subjected to the usual degreasing and pickling operations, are used as anodes in the above disclosed alkaline baths, while any substance suitable to resist the etching of the same alkaline solutions, such as iron, steel and nickel, may be used as cathodes.

Between the two electrodes a direct voltage is applied in the range of 30–80 volts with corresponding current density of about 10,000–50,000 a./m.$^2$, the temperature is kept between 30° and 80° C. and the treatment, in the course of which a diffuse light discharge is noticed along the treated surface, is continued for times comprising between 5 seconds and 1 minute. Alternatively, the treatment may be performed by applying an alternating current instead of a direct current, with an effective voltage in the order of 20–50, preferably 25–30, volts and an effective density of current in the order of 50,000–80,000 a./m.$^2$. In this latter case it will be possible to use only electrodes constituted by the articles of titanium or of the other named alloys and metals to be treated, thus avoiding the use of counter-electrodes constituted of different materials. Also in this connection the temperature of the bath is kept between 30 and 80° C. and the time of treatment ranges from 5 seconds to 1 minute.

The alkaline electrochemical treatment, either with direct or alternating current of titanium, its alloys, niobium, tantalum and like metals, imparts to said metals a pleasant appearance due to the formation of a superficial, velvety, mouse-colored layer which, in the case of titanium, reveals under X-ray examination the lines characteristic for titanium oxides, in particular for rutile; moreover this superficial layer is more wettable by water, shows a slight increase of hardness and an increase in electrical resistance.

The composition of the alkaline bath and the operating conditions may vary, as above indicated, within a wide range. In this connection, it has to be noted that by increasing the treatment temperatures, the voltage may be lowered, but it must be remembered that too high a temperature causes boiling phenomena at the surface of the treated material thus compromising the uniformity of the coating; under the same temperature, the treatment may be accomplished with decreasing concentration of the bath when the applied voltage is increased: there is however the fear of the formation of etching craters at the surface of the material.

In the case where the treated material is titanium, a dissolution of this metal with contemporaneous formation of dioxide (which may be recovered) takes place. The entirety of this dissolution may be reduced to a minimum, by suitably limiting the duration of the treatment within the stated range of times, since I have found that when a complete covering layer has been formed, a further extension of the treatment does not provide other improvements but essentially leads to a consumption of the titanium.

I have also found that in some cases, for instance when one wants to vary the characteristics of the layer, especially insofar as its color and compactness are concerned, it may be useful to add to the bath compounds of: lead, tin, antimony, bismuth, thallium, arsenic, copper, aluminum, alkaline-earth metals and other metal salts, as well as sodium silicate, sodium phosphate, borax and other products.

It is clear that the added substances must not be active with respect to the treated material under the treatment conditions and in particular must not contain fluorine, at least not in an easily soluble form. For example the addition of PbO may render it possible to reduce the alkali content of the bath.

It should also be noted that the properties of the coating layers may also be affected by subsequent surface treatments previously known in the art. In any case, the surface layers obtained with the new process of the present invention, which show a very good adhesion to the metal, are already suitable to allow a direct application to the metal, with good results, of some metal coatings such as of platinum and ruthenium (which are made to separate under specific conditions) or of nickel which is made to separate by reduction of its salts with hypophosphite.

However, as already indicated at the beginning of this disclosure, if one wants to obtain coating layers (through electrolytic or different known processes) having outstanding compactness, adhesion and uniformity characteristics, it is necessary, especially with certain metals, to further modify the surface of titanium or its alloys, niobium, and tantalum.

I have found that this second object of the invention may be accomplished by using a solution of an acid which at the same time exhibits the following characteristics: a medium or high dissociation degree and a mild aggressiveness towards the treated metal. For instance the following acid solutions satisfy the above requisites: aqueous solutions of hydrochloric acid, sulphuric acid, sulphuric acid and sodium chloride, perchloric acid, fluosilicic acid, fluoboric acid, all used in a wide range of concentrations.

Less suitable are the solutions of the following acids: nitric, acetic, sulphamic which have too low an aggressiveness, while the solutions of hydrofluoric acid which have too high an aggressiveness are not all suitable.

The structures to be treated, after the alkaline treatment described in what precedes, are dipped in the acid bath formed for example by 1 part by volume water and by 1 part by volume of aqueous solution of hydrochloric acid having density 1.19.

The structures are subjected in the bath, at room temperature, to an alternate current of industrial frequency of the order of 50 cycles, with voltages ranging from 1.5 to 8 volts and current density of the order of from 500 to 10,000 a./m.$^2$.

The electrodes may be all constituted by the material to be treated or else counter-electrodes may be used such as graphite, in the case of hydrochloric acid solutions, or of antimony-lead in the case of sulphuric acid solutions. By using counter-electrodes it is possible to operate at lower voltages.

Generally during the passing of the current, a gas development is noted at the surface of the material, which begins again after an interval.

The treatment time is between 1 and 3 minutes.

Increasing the acid concentration or the effective voltage, the two first steps may be shortened up to eliminate the interval during which no gas development takes place and the whole treatment is shortened.

In any case the treatment in the acidic bath must be stopped before the coating layer formed in the alkali bath is completely eliminated, in order to avoid formation of natural oxide again during the successive operations, preceding the plating treatment. It can be said that the acid treatment has to be regulated taking into account the aptitude of the following electro-plating, to eliminate by cathodic process, before or during the electrodeposition, the coating layer formed in the alkali bath.

The materials treated according to the invention are thus still coated by a film sufficient to protect them from the oxidation during the washing operations with water and during the transfer to the electro-plating bath, where they may be directly coated with highly adherent and, in case of high thickness layers of: copper, silver, gold, rhodium, ruthenium, platinum, nickel, chromium and other metals or their alloys. The known electrochemical processes or also the methods of metallization by reduction in vacuum or by hot-plating may be used.

Particularly speaking, good results are obtained in the galvanic deposition:

of rhodium, ruthenium, nickel, zinc, with sulphamic baths;
of platinum with a bath of chloroplatinic acid or other;
of chromium with a bath of chromic acid, to which hydrofluoric acid has been added;
of silver, gold with cyanide baths;
of copper with sulphate baths.

The materials coated with metals after the treatment according to the present invention may be subjected to heating for example between 400 and 600° C., under vacuum or under argon or like, for times of one hour or more, without noticing any separation of the coatings.

Among the titanium alloys which have been successfully subjected to the treatment of the invention, I can cite those containing: Cr 2.7%, Fe 1.3%; Cr 2.5%, Fe 1.5%; Cr 3%, Fe 1.5%; Cr 2.5%, Fe 1.5%, Mo 1.5%; Al 6%, V 4%; Al 7%; Mo 4%; Al 5%; Sn 2.5%.

The alloys containing Al are particularly interesting for the applications they have found in the astronautic and cryogenic fields.

I have finally found a particularly advantageous method to carry out both the alkaline and the acid treatment.

For the sake of simplicity, I will describe this method with reference to an alkaline treatment with direct current.

The metal article which must undergo the treatment need not be immersed in an alkaline electrolytic bath, but may be directly connected to the positive pole of a current generator. The counter-electrode, constituted by a cylinder or by a plate, is connected to the other pole of the current generator and is suitably spaced from the surface to be treated by a distance of some millimeters up to some centimeters.

The counter-electrode is slowly moved with respect to the article of titanium, its alloys, niobium, tantalum or the like to be treated, while maintaining at the same time a film of solution between them.

In practice the counter-electrode is coated with a pad constituted by a thick layer of cotton or other flexible, porous, insulating material, impregnated with the alkaline solution.

According to an alternative, direct contact of the electrodes may be avoided by using spacing elements made of insulating, solid materials such as Plexiglas, suitably spaced and pierced to allow the establishment and the maintenance of a layer of solution between the counter-electrode and the surface to be treated.

Devices as described are reproduced in the enclosed drawings.

FIGS. 1 and 2 represent a side and a front view of a device with a cylindrical pad.

FIG. 3 represents a view of a similar device having a pad in the form of vertical cylinder.

FIGS. 4 and 5 represent a bottom view and a sectioned elevation of a device provided with spacing elements of insulating material.

FIGS. 6 and 7 represent a device analogous to that of FIGS. 4 and 5.

In the figures, 1 indicates the piece to be treated, 2 the layer of solution, 3 the pad impregnated with solution, constituted by a flexible, porous insulating material, $3^1$ the insulating material provided at the bottom with openings allowing the solution to pass therethrough; this insulating material being substituted in FIGS. 4 to 7 for pad 3; 4 the counter-electrode connected to the current generator by means of a conductor 5; 6 the insulating hand grip for guiding the device; 7, see FIG. 3, an insulating ring, for example of polyethylene, which serves to fasten the layer of impregnated cotton.

The conditions of treatment or of the treatments are those described, while taking into account that with this method solutions of relatively low concentration must initially be used, for example, in the case of the alkaline solution, with no more than 500–600 g. of alkali per liter of solution, since the solutions undergo a strong evaporation during the operation and thus become increasingly concentrated.

The advantage of such an operating method resides essentially in the fact that the electrolytic baths may be eliminated, which, particularly when articles of wide dimensions must be treated, occupy a large volume; it provides also for the possibility of limiting the treatment to only one surface of the piece or only to a part of it and also for the possibility of extending the treatment to portions of the surface which otherwise could not be reached.

The following examples are furnished only with the purpose of illustrating the invention, without, however, limiting the same.

EXAMPLE 1

A plate of commercial titanium having a thickness of 1 mm. and a surface of 9 cm.$^2$, after degreasing with an organic solvent, was made to function as an anode in a bath kept at 65° C., containing 800 g. NaOH/l. of solution, using two cathodes of steel whose surface facing the anode was of about 6 cm.$^2$, with an interpolar distance of 3 cm.

By utilizing a source of direct current of about 50 volts, by adjusting the external circuit in such a manner as to obtain an interpolar voltage of about 30.5 volts and a current flow of 25 amperes, a uniform, pleasant coating layer is obtained within 30 seconds.

The plate washed with water is treated at about 25° C. in a bath constituted by 1 p. by volume of water and by 1 p. by volume of aqueous hydrochloric acid having a density 1.19. The plate is placed between two electrodes of graphite having an equivalent surface exposed to it and spaced from it by 2.5 cm.

By means of a source of alternating current, an interpolar voltage of about 3 effective volts is applied and a current flow having an intensity of about 3.5 effective a. is established.

After 2 minutes the plate is washed with water and coated with lead electrochemically deposited from a bath containing: lead sulphamate (1 mol of salt/l. of solution), free sulphamic acid (1 mol./l.), an adhesive (1 g./l.), phenol and other additives known to those skilled in the art.

The anodes are of lead. After 15 minutes deposition with a density of current of the order of 80 a./m.$^2$, a compact, perfectly adherent layer is obtained.

EXAMPLE 2

The same process as in the preceding example is performed, with the only difference being that the electrolytic coating is accomplished, under technically known conditions, from a bath containing antimony tartrate, tartaric acid and lead carbonate, so as to obtain a lead coating containing about 2% antimony, suitable for example (as that prepared in Example 1) as electrode-material in electrochemical sources of power (storage batteries or lead batteries).

EXAMPLE 3

The same process of Example 1 is repeated with the only difference being that the electrolytic coating is accomplished from a bath of CuSO$_4$ (125 g./l. of solution), containing 50 g./l. of free H$_2$SO$_4$ and 50 cc./l. of 95% ethyl alcohol, at room temperature, with copper anodes, density of current 150 a./m.$^2$, duration of the treatment 15 minutes.

EXAMPLE 4

A titanium plate which has undergone no pre-treatment, is made to function as anode in a bath of aqueous NaOH (800 g./l. concentration), with a voltage of 42 volts, current density 30,000 a./m.$^2$, temperature 75° C., duration of the treatment 15 seconds, counter-electrode of iron.

The titanium plate is washed with water and treated in an acid bath (1 p. by volume of water and 1 p. by volume of aqueous HCl, density 1.9) with alternate current of 50 periods/sec., tension about 4 volts, effective current density 3,000 a./m.$^2$. Duration of the treatment about 2 minutes, that is a time shorter than that necessary for a complete disapearance of the leaden colored layer. After this second acid treatment, the material is directly passed to the galvanic treatment, which provides perfectly adherent and compact coatings.

As a matter of fact, the titanium plate which has undergone the above treatments, has been coated with iridium by electroplating in a bath containing ammonium-chloro-iridate, ammonium fluoride, sulphuric acid anions and sodium ions, at room temperature.

The obtained iridium coating was perfectly compact and adherent.

In a similar manner, highly compact and adherent coatings have been obtained with rhodium and platinum; the so coated titanium may be successfully used for example as anode in electrochemical processes in the presence of hydrochloric acid solutions or of other corrosive agents.

EXAMPLE 5

A plate of commercial titanium having the following analysis, wherein the percentages are, by weight: C≤0.1; N≤0.8; O≤0.2; H≤0.02; Fe≤0.4; Si≤0.04, was subjected to a usual pickling operation in a hydrofluoric acid bath and then washed with water; the plate was used as anode in an aqueous solution containing 750 g./l. of NaOH at 65° C., with a steel cathode, under a voltage of 35 volts for a time of 2 minutes.

At the end of the treatment, after washing with water, the plate was coated with a platinum layer in a bath containing: platinum (as chloro-platinic acid) 2 g./l., ammonium dibasic phosphate 20 g./l. and sodium dibasic phosphate 100 g./l.; pH~7, temperature 70° C.

A strongly adherent coating was obtained, which did not even detach after repeated bending of the plate.

EXAMPLE 6

Reaction conditions were the same as in the preceding example, with the only difference being that the titanium plate after anodic treatment in alkaline solution and washing, was dipped into a bath formed of 1 part by volume of water and 1 part of aqueous hydrochloric acid of density 1.19: it was subjected, at room temperature, to the action of an alternating current at 50 cycles, under a voltage of 4 volts applied for 2 minutes, with a counter electrode of graphite. After washing with water, the plate was dipped into a bath containing: 12 g./l. of rhodium sulphamate, 1 mol./l. sulphamic acid temperature 25° C., current density 100 a./m.$^2$.

A rhodium coating was obtained which was perfectly adherent, without porosity, and did not detach even after strongly bending many times.

EXAMPLE 7

A rod of titanium alloy containing Cr 2.7% and Fe 1.3% after pickling and washing in hydrofluoric acid solution, was used as an anode in a bath containing 450 g./l. of NaOH, saturated with PbO: applied voltage 50 volts for 1 minute.

After washing with water, the rod was subjected for 2 minutes at room temperature to an alternating current at 50 cycles, with 4 volts applied between the electrodes in a bath containing 150 g./l. of sulphuric acid. The rod was then passed into a bath containing nickel sulphamate 2 mol./l. boric acid 30 g./l., nickel chloride 15 g./l.: temperature 50° C., density of current 150 a./m.$^2$. A perfectly adherent coating of nickel was obtained.

EXAMPLE 8

The process of Example 6 was repeated with the only difference being that a chromium coating was formed at 35° C. under a voltage of 4.5–5 volts and a current density of 150 a./m.$^2$, using a bath containing 260 g./l. of chromic acid, 2.5 g./l. of sulphuric acid, 5 g./l. of hydrofluoric acid.

A perfectly adherent coating layer was obtained.

EXAMPLE 9

A titanium plate undergoes alkaline treatment in an aqueous bath of NaOH (concentration 750 g./l.), with alternate current of 50 periods/sec., cell-tension 28 effective volts, current density 60,000 effective a./m.$^2$, time 30 sec.

After treatment in an acid bath as described in the preceding example, electrolytic coating layers, perfectly adherent and compact are obtained.

EXAMPLE 10

A titanium alloy containing 6% Al and 4% V, is used as anode in an aqueous NaOH bath (700 g./l. concentration), with applied voltage of 40 volts, effective current density 40,000 a./m.$^2$, temperature of the bath 60° C., duration of the treatment 10 sec.

The plate is washed with water and treated in an acid bath constituted by aqueous sulphuric acid (50% conc.) with alternating current at 50 periods/sec., cell-voltage 7 volts, current density 5,000 a./m.$^2$. Treatment duration 1.5 minutes.

After such a treatment the material may be passed on to any desired coating process, through which perfectly adherent and compact coating layers will be obtained.

EXAMPLE 11

A sample of titanium alloy containing 7% Al and 4% Mo is treated in a bath of aqueous NaOH (conc. 700 g./l.) with alternating current at 50 periods/sec., cell-voltage 30 effective volts, current density 60,000 effective a./m.$^2$, for a time of 30 seconds.

The so treated sample may be coated for example with a nickel layer, according to known methods, perfectly adherent coatings being obtained. Even superior properties of adherence and compactness may be obtained with coatings of any desired metal, if an acid treatment as described in the preceding example is performed after the alkaline one.

EXAMPLE 12

A plate of titanium alloy containing 5% Al and 2.5% Sn is subjected to an alkaline treatment, by using a device with a padded counter-electrode as previously described.

The pad is impregnated with an aqueous solution of KOH at 500 g./l. and the same solution is slowly dropped on the plate so as to form a film on it. The plate is connected to the positive pole of the current generator, while a steel counter-electrode is connected to the negative pole.

Applied voltage 40 volts, current density 30,000 a./m.$^2$, temperature 50° C. (the counter-electrode moves slowly on the plate).

The plate, after having undergone a treatment with alternating current in an acid bath, as described in the preceding examples, had a surface which was perfectly suitable to any successive coating with layers of different metals.

EXAMPLE 13

A little plate of niobium having a surface of 16 cm.$^2$, is used as anode in a bath containing 750 g. NaOH per liter of solution, the bath being kept at 50° C., applied voltage 34 volts and current of 24 a. After 25 sec. the plate is coated with a uniform lead colored layer, suitable, for example, to firmly bind layers of refractory oxides.

EXAMPLE 14

A small tantalum plate having a surface of 12 cm.$^2$ is used as anode in a bath containing 800 g. NaOH per liter of solution, with an applied voltage of 38 volts.

A current of 15 a. is established and after 10 sec. the plate appears coated with a uniform lead colored layer suitable for the adherence of coatings of refractory oxides, or also, in applications in electric apparatus and circuits.

I claim:

1. In a process for electroplating of a substrate metal consisting of titanium or a titanium alloy with a coating of a second metal, the improvement which comprises treating the surface of said substrate metal before applying said coating by passing an alternating or direct electric current between said substrate metal as one electrode and a second electrode through an aqueous solution of NaOH or KOH in a concentration range of 350 g./l. to saturation at a temperature in the range of 30° to 80° C. for a period of from five seconds to one minute, said substrate metal being an anode when using direct current.

2. A process according to claim 1, in which the aqueous solution contains also a substance from the group consisting of compounds of Pb, Al, Sn, As, Bi, Tl, alkaline-earth metals, sodium silicate, sodium phosphate and borax.

3. A process according to claim 1 in which the current is direct current having a voltage of 30 to 80 volts.

4. A process according to claim 1 in which the current is alternating current having a voltage of 20-50 effective volts.

5. A process according to claim 1 wherein the hydroxide concentration is 700/800 g./l. and the temperature is 65°–70° C.

6. A process according to claim 3 in which the treatment in the alkali solution is followed by a second treatment wherein an alternating current is passed between said substrate metal as one electrode and another electrode for a period of one to three minutes at a current density of 500 to 10,000 a./m.$^2$ while said electrodes are immersed in an aqueous solution of an acid selected from the group consisting of hydrochloric acid, sulfuric acid, fluoboric acid, fluosilicic acid and mixtures thereof.

7. A process according to claim 4 in which the second electrode is also titanium or titanium alloy.

8. A process according to claim 6 in which the solution contains 1 part aqueous HCl of density 1.19 per 1 part water, by volume.

References Cited

UNITED STATES PATENTS

| | | | |
|---|---|---|---|
| 2,961,395 | 11/1960 | Icxi | 204—224 |
| 2,871,423 | 1/1959 | Aikman | 317—230 |
| 2,720,488 | 10/1955 | Dwyer | 204—56 |
| 2,711,496 | 6/1955 | Ruben | 317—238 |
| 2,540,602 | 2/1951 | Thomas et al. | 204—15 |
| 1,552,591 | 9/1925 | Batenburg | 204—224 |

JOHN H. MACK, Primary Examiner

R. L. ANDREWS, Assistant Examiner

U.S. Cl. X.R.

204—56